United States Patent
Duan et al.

[11] Patent Number: 6,126,840
[45] Date of Patent: Oct. 3, 2000

[54] PROCESS FOR REMOVING SILVER IN THE PRESENCE OF IRON FROM WASTE EFFLUENT

[75] Inventors: Hailing Duan, Ridgewood, N.J.; William Lovell, St. Petersburg, Fla.

[73] Assignee: Fuji Hunt Photographic Chemicals, Inc., Paramus, N.J.

[21] Appl. No.: 09/133,367

[22] Filed: Aug. 13, 1998

[51] Int. Cl.[7] .................... C02F 1/56; C02F 1/62; G03C 5/26

[52] U.S. Cl. ............ 210/727; 210/713; 210/912; 423/42; 430/399

[58] Field of Search ........... 210/199, 202, 210/203, 195.3, 725–9, 713; 266/170; 423/42; 430/398–400

[56] References Cited

U.S. PATENT DOCUMENTS

| | | | |
|---|---|---|---|
| 4,238,328 | 12/1980 | Bowes et al. | 210/688 |
| 4,543,189 | 9/1985 | Rice et al. | 210/713 |
| 4,670,160 | 6/1987 | Moriya et al. | 210/728 |
| 4,731,187 | 3/1988 | Moriya et al. | 210/719 |
| 5,205,939 | 4/1993 | Syrinek | 210/727 |
| 5,288,728 | 2/1994 | Spears et al. | 210/729 |
| 5,437,792 | 8/1995 | Szembrot et al. | 210/727 |
| 5,523,002 | 6/1996 | Carey et al. | 210/728 |
| 5,534,148 | 7/1996 | Suzuki et al. | 210/605 |
| 5,549,820 | 8/1996 | Bober et al. | 210/199 |
| 5,575,915 | 11/1996 | Nakamura et al. | 210/631 |
| 5,605,633 | 2/1997 | Nakamura et al. | 210/732 |
| 5,728,295 | 3/1998 | Duan | 210/195.1 |
| 5,753,125 | 5/1998 | Kreisler | 210/710 |
| 5,795,485 | 8/1998 | Nakamura et al. | 210/714 |

FOREIGN PATENT DOCUMENTS

| | | |
|---|---|---|
| 832849 | 4/1998 | European Pat. Off. . |
| 50-075562 | 6/1975 | Japan . |
| 6-65744 | 3/1994 | Japan . |

*Primary Examiner*—David A. Simmons
*Assistant Examiner*—Frank M. Lawrence
*Attorney, Agent, or Firm*—Burns, Doane, Swecker & Mathis, L.L.P.

[57] ABSTRACT

Process and apparatus for treating an aqueous effluent with high concentrations of silver and ferric/ferrous complexes using multiple additions of one or more water-soluble sulfur containing polymer chelating agents, with optional additions of non-polymeric sulfur containing compounds. The presence of a high concentration of both dissolved silver and ferric/ferrous complexes prevents efficient silver removal by precipitation and the achievement of a very low residual silver concentration. By using multiple additions of the chelating agent(s), a higher degree of silver removal can be achieved than would be possible with the same amount of chelating agents added in a single stage. Effluent from photo finishing operations, particularly minilabs, can be effectively treated so that there is essentially no silver remaining in the treated effluent.

22 Claims, 7 Drawing Sheets

Minilab Waste Treatment - First-Step Dosing Efficiency

Minilab Waste Treatment - Second-Step Dosing Efficiency

PROCESS FOR REMOVING SILVER IN THE PRESENCE OF IRON FROM WASTE EFFLUENT

BACKGROUND OF THE INVENTION

1. Field of the Invention

The present invention relates to a process and an apparatus for effectively removing high levels of silver in the presence of high levels of ferric/ferrous complexes in aqueous effluents, particularly spent photo finishing solutions.

2. Description of the Related Art

Over the past few decades, environmental concerns of the scientific community as well as the general public, have brought attention to the problem of heavy metal ions in the waste water, i.e., effluent, discharged by industrial operations. In response to this concern, industries which generated such metal ions as waste have devised numerous ways of treating their waste to recover the metal ions and recycle or dispose of them in an environmentally acceptable manner. In many cases the governments in the industrialized countries have improved environmental protection programs by passing laws setting limits on the amounts of toxic metal ions which may be discharged. Further, national and regional governmental agencies, e.g., the Environmental Protection Agency (EPA) in the United States, have been established to monitor and police the discharge of metal ions into the environment. While waste containing heavy metal ions being discharged into the environment has significantly decreased in recent years, there is a continuing need for more effective and efficient means of removing metal ions from waste water.

Often, the metal ions in industrial effluent are of sufficient commercial value that recovery and recycling of these metal ions is not only environmentally desirable, but economically profitable as well. For example, the photographic industry generates waste from product manufacturing and film processing containing a substantial amount of silver, both metallic and in the form of silver complexes. Federal regulations limit discharge of ionic silver into sewerage systems to less than 5 ppm. However, municipal standards in Europe are usually not more than 0.1 ppm. Further, silver historically has been, and will continue to be, a semi-precious metal and valuable industrial material. Therefore, the photographic industry has the dual incentive to recover silver from its effluent to comply with environmental laws and to recycle a valuable resource.

Conventional methods used to remove silver include metal ion displacement, sulfide precipitation, adsorption onto an ion-exchange resin, electrolysis, electrodialysis and reverse osmosis. These methods are not universally satisfactory and some are plagued with problems which restrict their use, such as secondary pollution. A particular method widely used in the art of silver recovery from an aqueous solution comprises reacting the solution with precipitating and flocculating agents to form solid precipitates containing the silver to be removed. The solid precipitates may be removed by well known methods in the art for liquid-solid separation, such as settling, decanting, centrifuging, and filtering. The liquid remaining after the precipitated silver has been removed may be further treated, if necessary, or disposed in the sewerage system in accordance with environmental regulations.

Regarding precipitation technology, many different non-polymeric sulfur compounds have been used as precipitants, such as sodium sulfide, dimethyl- or diethyl-dithiocarbamate salts (U.S. Pat. No. 5,205,939), and trimercapto-s-triazine (U.S. Pat. No. 5,288,728, U.S. Pat. No. 5,549,820), etc. However, since these non-polymeric precipitants tend to form extremely fine precipitates when reacted with silver, the settling and filtration of such fine precipitates becomes very difficult. Even with the assistance and complexity of adding high molecular-weight cationic amine flocculating agents, as disclosed in U.S. Pat. No. 5,205,939 and U.S. Pat. No. 5,437,792, the resulting discharge silver level after treatment reaches only down to 0.3–1.5 ppm of residual silver remaining in the treated waste.

A method for removing silver which uses water-soluble sulfur containing, hydrophilic, linear polymer chelating agents ("SPCA's"), from a solution containing silver halides and silver ions has been applied both as the sole chelating agent to remove silver from waste solutions of manufacturing photosensitive materials (U.S. Pat. No. 5,575,915) and of large-scale photo finishing plants (JP 6-65744 (application Ser. No. 08/399,658), U.S. Pat. No. 5,605,633, U.S. patent application Ser. No. 08/632,542), and in combination with various non-polymeric sulfur compounds, U.S. Pat. No. 4,670,160 and U.S. Pat. No. 4,731,187.

One advantage of using SPCA's is that the discharge silver level in the treated waste can consistently reach extremely low levels (e.g. <0.04 ppm, or below the detection limit of standard atomic absorption spectroscopy) without added flocculating agent. However, the waste sources heretofore treated normally have initial low silver concentrations (e.g. 5–400 ppm) and usually contain insignificant amounts of ferric/ferrous complexes, normally present as the ferric/ferrous amino carboxylate complex in photographic effluent.

In addition, non-linear branched polymeric dithiocarbamate acid salts are reported as useful for precipitating metal contaminants from aqueous solution in U.S. Pat. No. 5,523,002. However, the data presented in this latter patent indicates that these salts are only marginally effective for removing silver to the desired low level.

U.S. Pat. No. 5,549,820 teaches an apparatus and a method for removing silver from photographic processing effluents. In general, the apparatus provides various means for the sequential addition of a non-polymeric sulfur precipitating agent followed by a flocculating agent. The flocculated precipitate is then separated from the liquid by settling tanks and/or filters. While the method and associated apparatus of the patent purports to be effective in removing silver over all typical effluent ranges of silver typically encountered in photographic processing waste, it does not disclose achieving the desired low levels of silver in the waste, i.e. less than 0.1 ppm, in the presence of high concentrations of ferric/ferrous complexes. Moreover, it does not use the SPCA's described in aforementioned U.S. Pat. No. 5,575,915; etc.

In recent years, small complete photo finishing labs, known as "minilabs" have appeared in photography shops, discount stores, and photo finishing kiosks in shopping centers. Typically a minilab is computerized and highly automated, requires only one operator, and allows a retailer to provide photo finishing service on site in one hour or less. The widespread use of minilabs has created a need for a highly efficient, cost effective means to treat the waste from minilabs so that waste can be disposed of in municipal sewerage systems.

The photographic minilab processing effluent solution contains extremely high levels of silver (typically in the range of 1.5–6 g/L). It also contains a significant amount of ferric/ferrous amino carboxylate complexes (typically in the range of 2–9 g/L as iron). The existence of such high levels of silver and ferric/ferrous complexes significantly reduces the effectiveness of the silver removing capability using SPCA's both as the sole chelating agent and also in combination with other non-polymeric sulfur compounds. The competition from the high ferric/ferrous complexes complex level in the solution renders it more difficult to reduce silver to very low levels, and consumes significant amounts of SPCA. In addition, the high initial silver concentration itself significantly reduces the silver-removing efficiency of the SPCA precipitant. Using a prior art treatment process (e.g. U.S. patent '915), the residual silver concentration in the treated minilab waste does not reach the similar low level as that of treated waste from a large-scale photo finishing plant, containing insignificant amounts of ferric/ferrous complexes, even at relatively much higher SPCA dosage.

With respect to the above mentioned SPCA's, branched varieties have been reported to be effective in removing specific metallic contaminants from aqueous solutions. For example, Carey (U.S. Pat. No. 5,523,002) describes the use of a water soluble, branched polydithiocarbamic acid salt for removing 75% or more of the following metal ions when dissolved in water: Cd, Cr, Co, Cu, Pb, Ni, Ti, V, and Zn. Other metal ions tested gave lower percentage reductions, and silver was only reduced by 30%, an amount that would not be considered efficient by current water treatment standards. In another example, Sparapany (U.S. Pat. No. 5,346,627) discloses the use of a water soluble, polyethyleneimine-dithiocarbamate (PEI-DTC) polymer to remove silver and ferric/ferrous complexes from waste water. However, the question of optimizing silver removal to very low levels in the presence of substantial quantities of ferric/ferrous complexes is not discussed.

There is therefore a need to 1) efficiently and cost effectively remove high quantities of silver, from aqueous effluents, particularly effluents from photo finishing processes which have high concentrations of ferric/ferrous complexes and other contaminants so as to attain very low residual levels of silver, i.e. under 0.1 ppm, and 2) apply branched PEI-DTC polymers for such economically selective and efficient silver removal.

SUMMARY OF THE INVENTION

The invention provides a method and an apparatus that can effectively and efficiently utilize the silver capturing capacity of the SPCA precipitant, either when used as the sole chelating agent or in combination with non-polymeric sulfur compounds, without the need of additional, complicated pre- or post-chemical treatment, such as by adding flocculating agent, and thus provides an effective and low cost way to recover silver from the minilab spent solutions, which contain substantial quantities of ferric/ferrous complexes, both for economical benefit and for stringent environmental compliance so as to attain very low residual levels of silver, typically less than 0.1 ppm.

Alternatively expressed, the invention lies in the application of a predetermined quantity of an SPCA in divided doses to an aqueous effluent containing silver, particularly effluent from a photo finishing process, in the presence of high concentrations of potentially interfering ferric/ferrous complexes, to eventually produce a lower final silver concentration than the same quantity of chelating agent would yield if added as a single dose. Moreover it has been found that no matter how large a single dose of chelating agent is added, residual silver levels cannot be lowered below a certain level, as discussed in detail below.

To effectively capture silver ions or its complexes in aqueous medium, the selected SPCA must be highly hydrophilic, and both it and any other optional non-polymeric sulfur compounds must be able to be rapidly and homogeneously dispersed into the solution to be treated. To achieve the targeted extremely low residual silver level, the selected SPCA and other optional non-polymeric sulfur compounds should have a strong affinity towards silver ions, and its complexes, and yet have minimum affinity towards any other co-existing ingredients, such as ferric/ferrous complexes (i.e., high selectivity towards silver). To achieve the above goal without relying on additional pre- or post-chemical treatment, as discussed above, the selected SPCA should have either a large molecular structure or have a strong potential to form a large structural network via intra molecular interaction, such that its water solubility will significantly decrease after capturing silver, and thereby yield large coagulated particulate silver-containing precipitate that can then be easily removed from the solution by settling and/or filtration. Furthermore, the activity of the silver-capturing functional groups in the SPCA should not be affected by the chemical environment of the solution to be treated, e.g. pH, and have a long shelf-life, e.g. resist oxidation by air.

To satisfy all these requirements, a water soluble SPCA is the most suitable choice of precipitating agent. Sulfur-containing functional groups in the form of their alkaline or alkaline-earth metal ions salts have great solubility in aqueous solution and strong affinity towards silver ions. After capturing silver, their water solubility becomes extremely poor, and therefore may turn the entire polymer to insoluble precipitate.

Suitable non-polymeric sulfur compounds may optionally be added to the SPCA solution or dispersion to increase the bulk density of the silver precipitate, increase settling speed, and reduce the cost of both the total chelating agent required to treat a given quantity of photographic effluent and transportation of the precipitate to a chemical disposal/refining service.

The design of the treatment process and the apparatus is important to efficiently utilize the available capacity of the above mentioned types of SPCA's and effectively overcome the interference from the high level of co-existing ferric/ferrous complexes, and therefore to achieve the targeted low residual silver level with minimum SPCA consumption. In one embodiment of this invention, the treatment process comprises the following five steps.

(1) Pre-disperse the SPCA into a medium miscible or soluble with the photo processing effluent. This will allow sufficient dispersion of the precipitating agent into the reaction medium before contacting with silver.

(2) Contact the silver containing photo processing effluent with a first portion of the pre-dispersed SPCA in a continuous stream to precipitate the major amount of silver in the photo processing effluent.

(3) Conduct a preliminary separation of the precipitate generated in the resulting solution stream with a sedimentation chamber, or a filter having suitable pore-size and medium area.

(4) Inject a second and proportionately smaller portion of the dispersed SPCA into the resulting solution stream from step (3) with a higher effective dosage (compared to the residual silver level in the solution stream in step (3)) to precipitate the residual silver and reduce the dissolved silver level in the final effluent below targeted discharge limits.

(5) Finally separate the precipitate with a final filtration, and discharge the thus treated effluent to the drain; or alternatively send the treated mixture to a clarification chamber, and continuously force the overflow through a top opening of a chamber to a second filter, while recycling the partially clarified solution at the bottom of the chamber (containing most of the precipitate) to the process line at any point before the first-stage separation, but preferably before the first SPCA injection point.

The advantage of the recycling alternative is to transfer most of the precipitate formed in step (4) to the preliminary separation step, and thus reduce the load on the second filter, which will prevent premature pressure build-up in the second filter. Another advantage of the recycling alternative is to provide a second contacting means for the precipitate (formed after the second SPCA dosage) to react with free silver so that any unsaturated portion of the silver-SPCA complex may be further saturated by the high level of incoming silver. This will increase the desilvering efficiency of the SPCA by fully utilizing its silver capturing capacity, particularly for the SPCA dosed in the second portion, and thereby reduce treatment costs.

In one aspect, the present invention relates to a process for treating an aqueous effluent comprised of from about 100 ppm to about 10 g/l ferric/ferrous complexes, from about 500 ppm to about 10 g/l silver, and water. The process comprises:

a) adding to the aqueous effluent a first amount of a water-soluble sulfur containing polymer chelating agent to form a precipitate and a first residual aqueous effluent;

b) adding to the first residual aqueous effluent a second amount of a water-soluble sulfur containing polymer chelating agent to form a precipitate and a second residual aqueous effluent; and c) separating the precipitate from the second residual aqueous effluent.

Insofar as the silver removal is substantially more efficient when adding two doses of the SPCA compared to a single dose as discussed above, the relative bulk density of the resulting precipitate may be low, resulting in a significant volume of precipitate that must be disposed of per given quantity of silver removed from the photographic effluent. Therefore, in another embodiment of the invention, it has been discovered that adding non-polymeric sulfur compounds which are capable of forming a water insoluble complex with silver to the SPCA solution or dispersion, may cause a significant increase in bulk density in the silver precipitate. This will allow significantly more silver precipitate to be packed into a smaller volume beyond which could done if the SPCA was used alone, and thereby extend the useful life of the particular filter cartridge or precipitate collection vessel used to treat the photographic effluent. Another advantage to this embodiment is that the precipitate resulting from the SPCA and the non-polymeric sulfur compound is heavier that the precipitate from SPCA alone, and therefore settles faster that the pure SPCA precipitate. This property may therefore allow in many cases, a simpler batch process to be used to remove silver from photographic effluent compared with a continuous (or recycle) process often employed to advantage with lighter, less easily settlable precipitates. A third advantage is that treatment costs may be reduced by selecting relatively low cost non-polymeric sulfur compounds such as sodium sulfide, which can reduce the needed quantity of the usually more costly SPCA typically available.

A fourth advantage is that transportation costs may also be reduced due to the decreased bulk of the silver precipitate that must be shipped to the waste treatment facility.

Therefore in another aspect, the present invention relates to a) adding to the aqueous effluent a mixture of a water-soluble sulfur containing polymer chelating agent and a water soluble non-polymeric sulfur compound capable of forming a water insoluble complex with silver to form a precipitate and a first residual aqueous effluent;

b) adding to the first residual aqueous effluent a second amount of a mixture of a water-soluble sulfur containing polymer chelating agent and a water-soluble non-polymeric sulfur containing compound capable of forming a water insoluble complex with silver to form a precipitate and a second residual aqueous effluent; and c) separating the precipitate from the second residual aqueous effluent.

In another aspect, the present invention relates to an apparatus for treating an aqueous effluent comprised of from about 100 ppm to about 10 g/l ferric/ferrous complexes, from about 500 ppm to about 10 g/l silver, and water. The apparatus comprises:

a) a source of aqueous effluent comprised of from about 100 ppm to about 10 g/l ferric/ferrous complexes, from about 1,000 ppm to about 6 g/l silver, and water;

b) a source of a chelating agent selected from the group consisting of a water-soluble sulfur containing polymer chelating agent or a mixture of a water-soluble sulfur containing polymer chelating agent and a water-soluble non-polymeric sulfur containing compound capable of forming a water insoluble complex with silver;

c) means for adding the chelating agent to the aqueous effluent so as to form a first precipitate and a first residual aqueous effluent;

d) means for separating the first precipitate from the first residual aqueous effluent;

e) means for adding the chelating agent to the first residual aqueous effluent so as to form a second precipitate and a second residual aqueous effluent; and f) means for separating the second precipitate from the second residual aqueous effluent.

DESCRIPTION OF THE PREFERRED EMBODIMENTS

Figure 1:
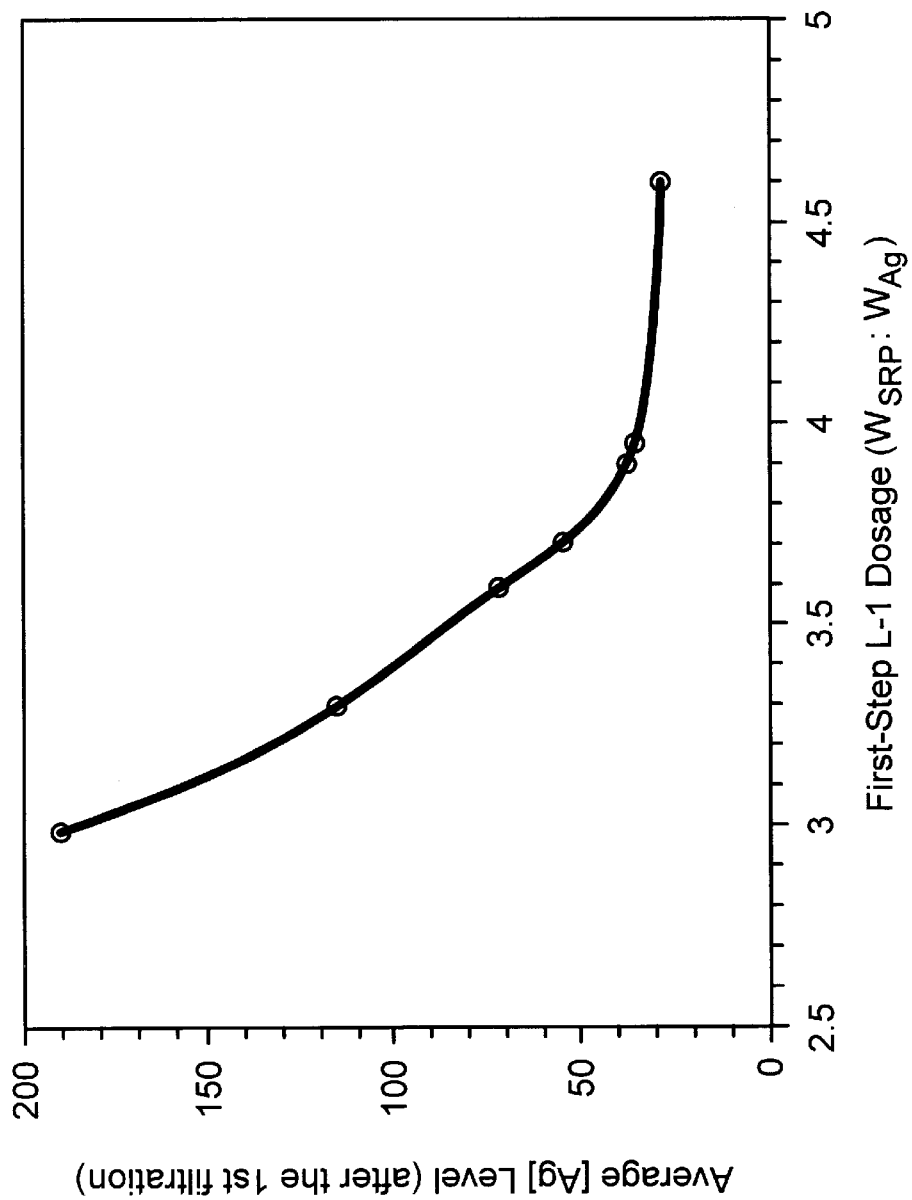
FIG. 1 is a graph illustrating the relationship of residual silver concentration in minilab effluent (in ppm) and L-1 chelating agent dosage after single stage treatment.

The terms "photo finishing," "photo processing," and "photo development" as used herein are synonymous and have the usual meaning recognized in the art of silver halide based photography. That is, these terms cover all treatment of exposed photographic light sensitive materials to convert them into useful, image bearing materials, and include production of photographs and motion pictures from film exposed in a camera, as well as, processing of exposed X-ray film.

The term "minilab" means a small, automated machine, or group of machines, for processing exposed photographic film to yield finished photographs. Minilabs are often used by photographic retailers to provide rapid, in-store photo finishing service.

For purposes of the present invention, the term "SPCA" means a water-soluble, sulfur containing polymer chelating agent capable of reacting with silver, or a salt thereof, to form an insoluble complex, i.e., a precipitate.

The term non-polymeric sulfur containing compound "NPSC" denotes a water-soluble sulfur containing molecule capable of dissociating into a sulfide anion at a pH above 9.0 in aqueous media, and which has a molecular weight under 1,000; preferably under 500.

Although there may be many possible SPCA's which will chelate silver in the presence of ferric/ferrous complexes in an aqueous solution as required in the present invention, those represented by the Formulas (I), (II), and (III); are particularly useful in the present invention.

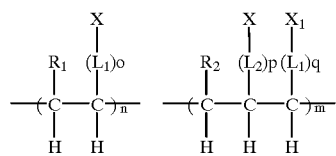

(I)

wherein,
one of X and $X_1$ is SM, —NHCOSM, —NHCS$_2$M, or —CH$_2$NHCS$_2$M, and the other is H;
$R_1$ and $R_2$ are independently H, alkyl, aryl, alkoxyl (substituted or unsubstituted), hydroxyl, carboxyl, thiol or amino;
$L_1$ and $L_2$ are independently a substituted or unsubstituted divalent alkyl, aryl, or alkoxyl linking group;
o, p, q are independently 0 or 1;
M is independently H, or a cation;
$0 \leq n \leq 30{,}000$;
$0 \leq m \leq 30{,}000$; and
$(n+m) > 100$ (preferably $300 \leq (n+m) \leq 10{,}000$).

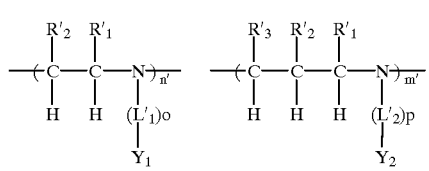

(II)

wherein,
$Y_1$ and $Y_2$ are independently —COSM' or —CS$_2$M';
$R_1'$, $R_2'$, and $R_3'$ have the same definitions as $R_1$ and $R_2$ in formula I and can be the same or different;
$L_1'$, and $L_2'$, have the same definitions as $L_1$ and $L_2$ in formula I and can be the same or different;
M' is H, or a cation;

o, p are independently 0 or 1;
$0 \leq n' \leq 30{,}000$, $0 \leq m' \leq 30{,}000$, and $(n'+m') > 100$ (preferably $300 \leq (n'+m') \leq 10{,}000$);

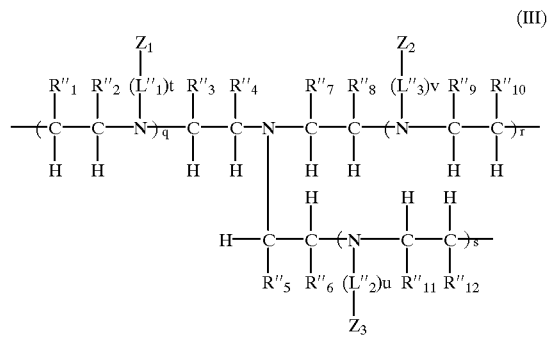

(III)

wherein
$Z_1$, $Z_2$, and $Z_3$ are independently H, CS$_2$M", COSM", but are not all H;
M" is independently H or a cation;
$R_1"$ through $R_{12}"$ are independently H, substituted or unsubstituted alkyl, aryl, alkoxyl groups; or hydroxyl, thiol, amino, carboxyl, thiocarboxyl, or dithiocarbamate;
$L_1"$, $L_2"$, and $L_3"$ have the same definitions as $L_1$ and $L_2$ in Formula (I) and can be the same or different;
t, u, v are independently 0 or 1;
$0 \leq q, r, s \leq 30{,}000$; and the sum of q, r and s is an integer greater than 15.

The monomer units in the compounds of formulas I, and II may form a copolymer, wherein, e.g., the requirement for n and m becomes the requirement for the sum of n and n' and m and m'. Further, in a preferred group of the compounds of Formula (III), greater than 50 mole percent of $Z_1$, $Z_2$, and $Z_3$ collectively are CS$_2$M", M" is an alkali metal ion, $R_1"$ through $R_{12}"$ is H; t, u, and v are all zero; and the sum of q, r, and s is an integer greater than 15. In a particular group of the compounds of formula III, greater than 80 mole percent of $Z_1$, $Z_2$, and $Z_3$ collectively are CS$_2$M", M" is an alkali metal ion, $R_1"$ through $R_{12}"$ is H; t, u, and v are all zero; and the sum of q, r, and s is an integer greater than 500.

From the foregoing description, it can be understood that the water-soluble sulfur containing polymer chelating agent typically has the sulfur atom in the form of a group selected from the group consisting of a thiol group, a thiocarboxyl group, a dithiocarboxyl group and a dithiocarbamic acid group and salts thereof. Compounds of Formulas (I) and (II) are taught in allowed U.S. patent application Ser. No. 08/348,806 (now U.S. Pat. No. 5,605,633) and U.S. Pat. No. 5,575,915, and compounds of Formula (III), are taught in U.S. Pat. Nos. 5,523,002; 5,019,274; and 5,164,095; the contents of all of which are incorporated herein by reference.

Suitable SPCA's of Formulas (I) and (II) are commercially available from Myoshi Oil and Fat Co. Ltd, Tokyo, Japan under the name Epoflock L-1 ("L-1"), and Epoflock L-2 ("L-2"), while a polymer or a blend in accordance with Formula (III) is available from both BetzDearborn Laboratories of Horsham, Pa. under the designation Betz 5636 ("B-5636"), and Nalco Chemical Company of Naperville, Ill. under the designation Nalco 8702 ("N-8702"). The chelating agent is generally maintained as an aqueous solution so that it can be added by conventional metering pumps. Typically, the commercially available aqueous solution contains the chelating agent in an amount of from about 20 to about 50% by weight, preferably from about 25 to about 40% by weight of the solution.

In the present invention, it is important that the SPCA be added in two or more stages.

There are many useful NPSC's which will chelate silver in the presence of SPCA's and ferric/ferrous complexes in an aqueous solution as required in the present invention. Preferred compounds include water soluble or dispersible alkali metal monosulfides, polysulfides, hydrogen sulfides, alkyl sulfides, C1 to C4 alkyldithiocarbamates, and mercapto-s-triazines.

Sodium monosulfide, sodium diethylcarbamate and sodium dimethylcarbamate are especially preferred due to their low cost, ready water solubility, and optimum precipitate morphology. Useful examples of sodium polysulfides include sodium disulfide, trisulfide, tetrasulfide, and pentasulfide compounds.

Useful NPSC's for treating the photographic effluent are capable of forming sulfide anions when dissolved in water at high pH, preferably at a pH of 9.0 or greater, more preferably at a pH of 10.0 or greater. The amount of silver capable of being complexed by useful NPSC's is proportional to the weight of the sulfide anion potentially formed upon dissolution of the NPSC in water at a pH greater than 10. In a preferred embodiment, an aqueous solution of one or more SPCA's and one or more NPSC's is prepared and added to the photographic effluent in two or more successive doses according to the invention so as to obtain very low residual silver levels, i.e. below 0.04 ppm. For a given specific combination of SPCA and NPSC there will be a range of concentration ratios which will provide optimum efficiency in removing silver, i.e. achieving the required discharge level of silver with a short processing time, optimum silver precipitate morphology (particle size, weight, and overall bulk density), and low total chelating agent material cost. Preferably, the weight/weight (w/w) ratio of SPCA to the NPSC's is in the range of 44:1 to 5:1, most preferably 20:1 to 8:1.

It has been found that the presence of high concentrations of ferric/ferrous complexes in the aqueous effluent generally ranging from about 100 ppm to about 10,000 ppm (10 g/l), more typically ranging from about 1 to about 6 g/l and more specifically ranging from about 3 to about 5 g/l adversely affects the silver chelating capacity of the SPCA. In minilab effluent, the ferric/ferrous complexes are in the form of ferric/ferrous amino carboxylate complexes, e.g. Fe EDTA, Fe PDTA, and the like, and is contributed from the overflow or carryover from the photographic bleaching agent. Other typical examples of ferric/ferrous amino carboxylate complexes which may be encountered in minilab effluent are summarized in e.g. U.S. Pat. No. 4,983,503; col. 7, line 58 to col. 8, line 33; which is incorporated herein by reference.

The silver is present in the effluent in an amount generally ranging from about 1,000 ppm to about 10 g/l, more typically ranging from about 1 to about 6 g/l and more specifically ranging from about 1.5 to about 3 g/l. Unlike the effluent resulting from the preparation of photographic materials, there are substantially no or a very low concentration of silver halides in minilab effluent stream.

By following the present invention, one can obtain a concentration of residual silver that is significantly lower than the concentration of residual silver that can be attained if the same amount of chelating agent is added in one step.

Figure 3:
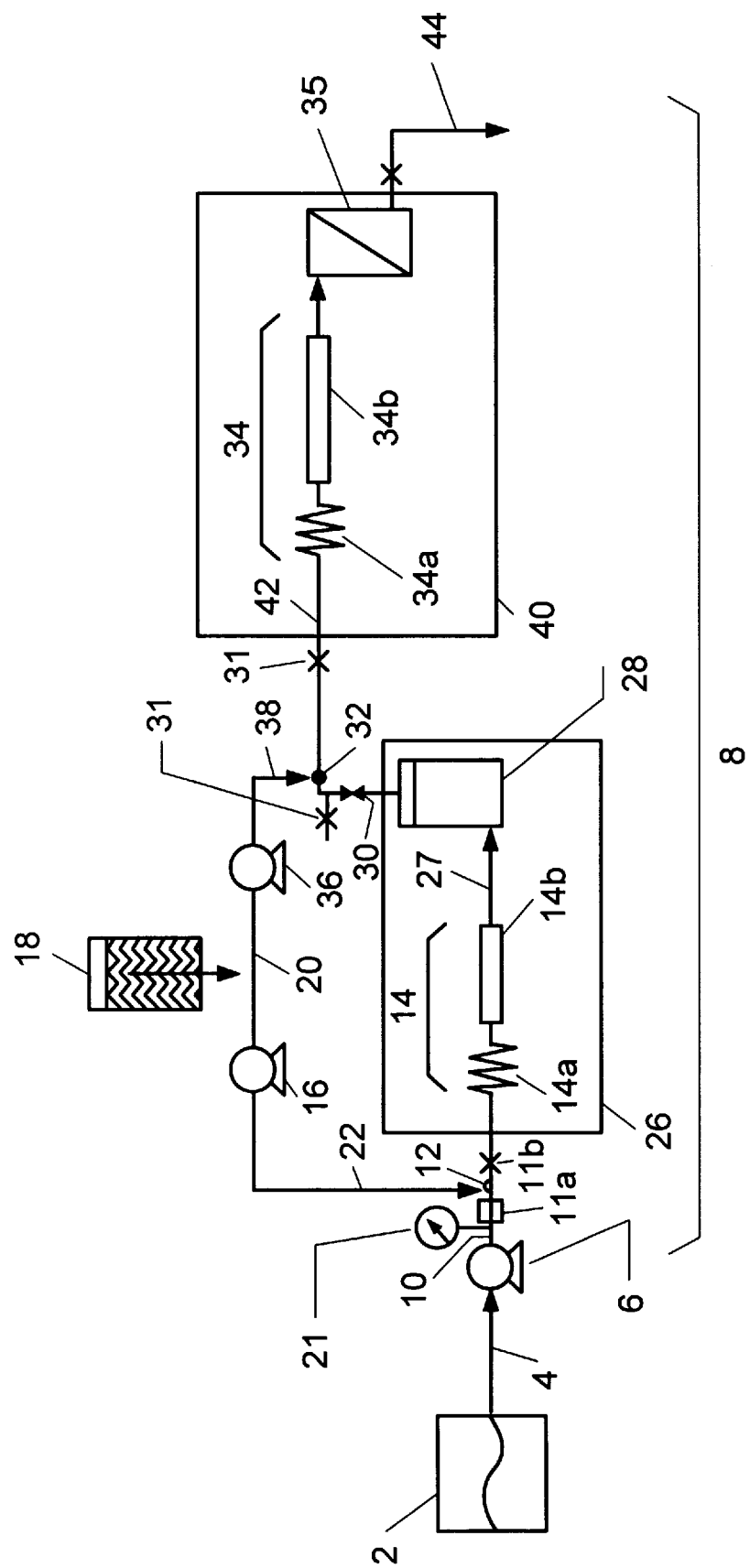
FIG. 3 is a schematic diagram illustrating an embodiment of the present invention.

FIG. 1 illustrates the effect of increasing the weight ratio of specific SPCA L-1 to silver using a single step treatment and the apparatus depicted in FIG. 3. Minilab mixed overflow effluent (as described above) containing about 2 g/l of silver and iron as a ferric/ferrous amino carboxylate complex in a concentration of approximately 3.0 g/l as iron was treated with a chelating agent composed of a 10% diluted aqueous solution of L-1 containing 35–40% polymer content prior to dilution. The single stage reaction time was about 3 minutes. The dosing ratio is calculated as the weight ratio of undiluted L-1 to the total weight of silver treated. The treated effluent was passed through a 1 micron Harmsco pleated filter cartridge, and a sample was removed prior to subsequent dosing with additional L-1. The residual silver was analyzed using an atomic absorption spectrophotometer.

From the results of FIG. 1, it can be understood that even if the amount of SPCA is increased, a substantial amount of silver remains in the effluent.

Figure 2:
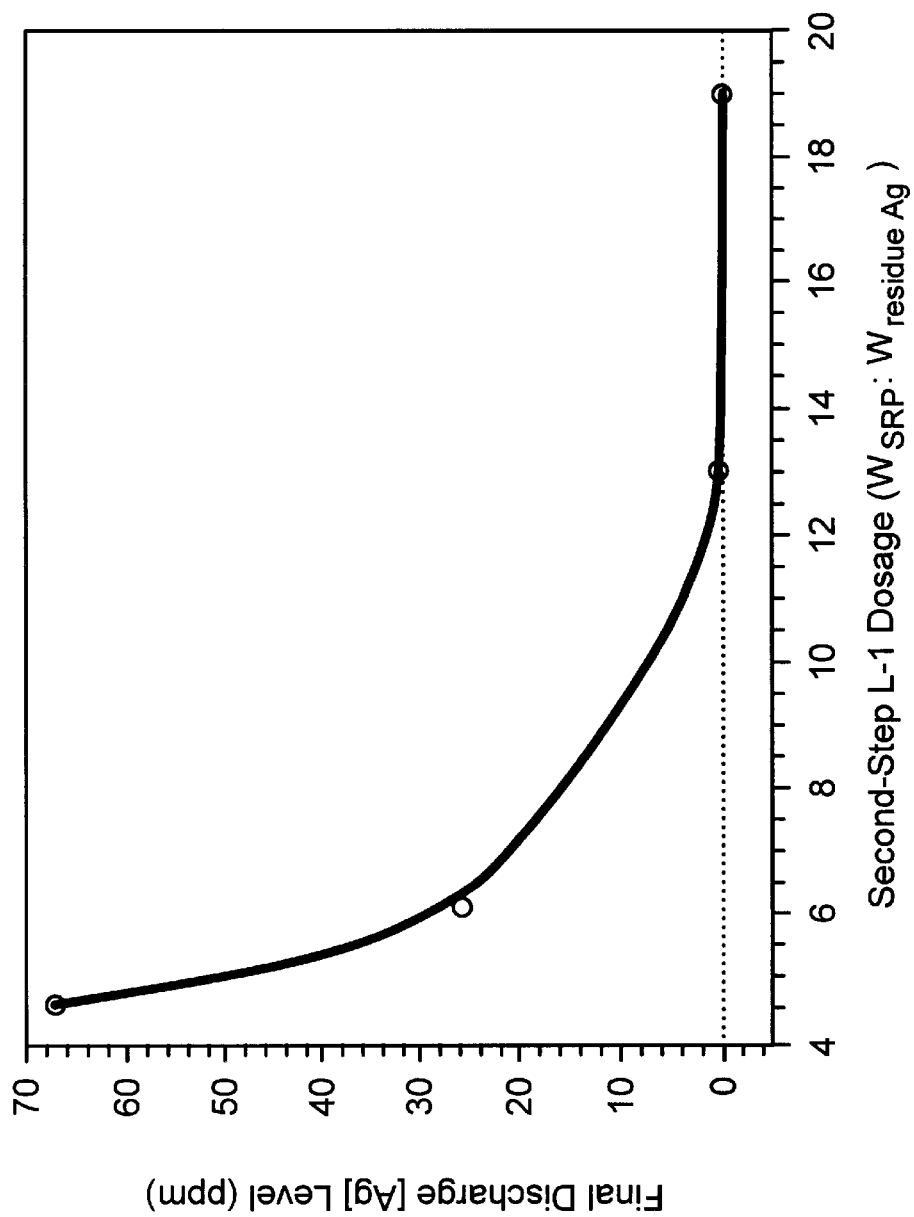
FIG. 2 is a graph illustrating the relationship of residual silver concentration in minilab effluent (in ppm) and L-1 chelating agent dosage after second stage treatment.

FIG. 2 illustrates the effectiveness of a second stage treatment of the same effluent samples that were the subject of single step treatment according to the procedure illustrated in FIG. 1. The starting silver concentration was in the range of from about 50 to 500 ppm and an additional amount of L-1 was added as the SPCA. A total reaction time of about 7 minutes was used. The treated effluent was passed through a 1 micron Harmsco pleated filter cartridge and the residual silver was analyzed as before.

From the results of FIG. 2, it can be understood that in accordance with the present invention, one can effectively treat a silver-containing aqueous effluent despite the presence of a high concentration of iron and essentially attain complete silver removal from the effluent.

The amount of SPCA and optional NPSC (collectively defined here as chelating agents or "CA") added to each stage of the process will depend on various factors including the precise composition of the aqueous effluent, the number of stages used, the type of CA and the manner in which the CA is combined with the aqueous effluent. Typically, the ratio of the weight amount of the SPCA to the weight amount of silver in the effluent in the first stage is adjusted so that the ratio of the weight of CA to the weight of dissolved silver to be treated increases in stepwise manner with the second and subsequent doses.

In order to add the SPCA to the aqueous effluent, any conventional means can be used. For instance, one can simply mix the aqueous effluent and a solution of the CA in a conduit. Alternatively, one can use an in-line or static mixer which can be compact in size and operate without moving parts which are advantageous in minilab construction. Furthermore, one can use a mixer that includes some type of moving agitator which is typically located in a separate mixing tank. It has been found that sufficient agitation improves the efficiency of silver removal by the SPCA. Where practical, one can use an appropriate mixing means in order to achieve the desired level of agitation.

After the first stage addition of the SPCA to the aqueous effluent, a precipitate is formed as the CA binds with the silver present in the aqueous effluent and a first residual aqueous effluent is thereby formed. The precipitate can be removed after the first stage addition of the SPCA or can be permitted to remain in the first residual aqueous effluent which is then subjected to the second stage addition of the CA. Upon the removal of the precipitate after the first stage, the amount of residual silver is generally from about 2 to about 200 ppm, preferably from about 50 to about 100 ppm. The second stage addition forms additional precipitate and results in a second residual aqueous effluent which optimally has a very low concentration of residual silver. If desired, additional stages can be used, with or without prior removal of precipitate, until the desired level of residual silver is reached.

The precipitate can be separated from the residual effluent by various conventional techniques. For instance, one can use filtration, settling, or centrifugation. Combinations of such techniques may also be used. Where filtering is used, the filter can be in the form of conventional cartridges or other shapes which are effective in separating particles on the order of from about 0.1 to about 10 microns. In a preferred embodiment, the filter is vertically suspended with the residual effluent being removed through the top of the vessel containing the filter. In this arrangement, precipitate can settle to the bottom of the vessel or initially contact the filter and then settle to the bottom thereby increasing the life of the filter and enabling ease of replacement. In a further embodiment of the invention, at least a portion of the residual effluent can be recycled, after the first stage addition of the CA.

In the context of treating minilab effluent, the present invention can be readily integrated into an automated system with the sequence and timing of the addition and mixing of the CA with the aqueous effluent, the transfer to the separation vessel and the removal of the residual effluent all being controlled by computer operated valves. If desired, additional treatment steps can be used to purify the effluent further so that it may ultimately be passed to a sewage system or reused.

The photo processing effluent described below was obtained by combining Minilab bleach fix and stabilizer overflows (hereafter "minilab mixed overflow effluent"). Typical combined overflows had a silver concentration of about 1.5 to 3 g/l and a ferric/ferrous concentration of about 3 g/l. The composition of the combined overflows from photo processing such as the samples treated here has been described in detail in e.g. "An Overview of Photofinishing and the Environment" by D. N. Spring, Photo Marketing Association International, August 1991; and "Wastewater Regulation Overview" compiled by the Society of Photo Finishing Engineers, a section of Photo Marketing Association International, Jan. 1, 1992, the contents of which are incorporated by reference. Mixed overflows from seasoned bleach-fix and stabilizer usually contain silver complexed with thiosulfate anion, ferric/ferrous complexed with EDTA and/or PDTA, and other organic and inorganic constituents.

The process of the present invention may be carried out using any means or combination of means known in the art of photographic chemical processing. FIG. 3 illustrates an embodiment particularly suited to carry out the present process and serves to exemplify each of the required steps.

In the drawing, aqueous effluent containing high concentrations of silver and ferric/ferrous complexes from a photo finishing minilab 2, pass through intake conduit 4, enter a feed pump 6 which pressurizes a silver recovery system generally represented by 8 and provides a steady and consistent flow of effluent through the system. The pressurized effluent exits the feed pump 6 through a conduit 10, through union 12, and into a coiled conduit, "first timing conduit" 14. Optionally placed between the feed pump 6 and union 12, is a pressure switch 21 which avoids pressure buildup, a flow meter 11a, which indicates the flow rate, and a valve 11b, which controls the flow rate.

A first stage metering pump 16 draws a predetermined amount of CA in an aqueous solution from a reservoir 18 through uptake conduit 20 and, via output conduit 22, injects the CA solution through union 12 into the pressurized effluent conduit. Optionally, a control valve to control the flow of CA solution may be placed in output conduit 22, as well as a check valve, to prevent back flow into the first dose metering pump.

The conduit used in the apparatus may be a rigid or flexible section of tube or pipe (typically of circular cross section) fabricated of a material which can withstand the pressure created by the feed pump 6 and not be attacked by constituents of the effluent. Examples of suitable material for fabrication of conduit include corrosion resistant metal ions alloys, such stainless steel, and polymers, such as high density polypropylene. Unions, optional flow meters, pressure gauges, and valves used in conjunction with the chosen conduit may conveniently be those typically used in the art with that type of conduit.

As the pressurized effluent and injected CA solution passes through the first timing conduit 14, the silver in the effluent becomes bound to the CA to form an insoluble complex which precipitates. As used herein a timing conduit, such as the first timing conduit 14, is essentially a length of tubing which provides sufficient time for the CA and the effluent to completely mix and form a complex as the two materials flow together down the conduit to the next processing step. The conduit is typically coiled primarily to conserve space, but would function in substantially the same way independent of its configuration. For example, it could be a straight tube.

As the effluent and precipitated complex leave the first timing conduit 14, via conduit 27, the pressurized effluent passes through a filter 28, which may be in the form of a closed vessel containing a cylindrical cartridge or bag filter, that separates the precipitated CA-silver complex from the effluent. The precipitate can settle to the bottom of the filter, thereby increasing the effective life of the filter.

Upon exiting the first stage filter system 26 via conduit 30, the effluent passes through union 32, and into the second timing conduit 34 within the second stage filter system 40 through conduit 42. A second dose metering pump 36 draws a predetermined amount of CA in an aqueous solution from a reservoir 18 through uptake conduit 20 and via output conduit 38, injects it through union 32 into the pressurized effluent. Both the first and second stage pumps may draw from a separate reservoirs where the concentration of CA may be the same or different for both stages. The second stage metering pump 36, the second timing conduit 34 and the conduits and union associated therewith are substantially the same as the first stage metering pump 16, first timing conduit 14, and associated conduits, valves and unions, respectively.

Optionally, a sampling valve 31 may be placed in conduit 30 before union 32. This valve allows samples to be taken before the second stage to determine the effectiveness of the silver removal after the first stage.

As the pressurized effluent and injected CA mixture pass through the second timing conduit 34, they mix and the silver remaining in the effluent becomes bound to the CA to form an insoluble complex which precipitates. As the effluent and precipitated complex leave the second timing conduit 34 within the second stage filter system 40 and enter filter 35, the effluent and precipitated complex are separated in substantially the same way as in the first stage filter system 26. The effluent, now substantially free of silver, leaves the second filtering system 40, via conduit 44, and can be introduced into a municipal sewerage system.

First stage timing conduit 14 and second stage timing conduit 34 are substantially the same or are similar in design so that they can be discussed together. The length of the conduit is chosen to provide the optimum time for reaction, and the rate of flow and the diameter of the conduit are factors determining time of flow within the conduit. Timing conduits and functionally equivalent devices are well known in the art of chemical processing, especially in continuous flow processes.

Timing conduits 14 (34) are comprised of an upstream mixing conduit 14a (34a) and a downstream precipitation conduit 14b (34b), respectively. The mixing conduit 14a (34a) is typically a narrower segment of tubing which facilitates the mixing of the silver-containing effluent with the CA solution. Upon exiting the mixing conduit 14a (34a), the CA is allowed to chelate the silver in the effluent and form an insoluble precipitate as the mixture passes through the precipitating conduit 14b (34a). The mixing conduit 14a (34a) and the precipitating conduit 14b (34b) are typically of different dimensions and may be of different configurations. Further, the dimensions of timing conduit 14 and timing conduit 34 may differ so that the mixing and precipitation time for the effluent and CA would be different for the two conduits.

Typically, the feed pump 6 generates a flow rate of about 100 ml/min, and typical resident times in the timing conduit components are as follows:

| Components of timing conduits 14 & 34 | Resident time |
|---|---|
| Mixing conduit 14a | 3–5 sec. |
| Precipitation conduit 14b | 1–2 min. |
| Mixing conduit 34a | 5–10 sec. |
| Precipitation conduit 34b | 2–3 min. |

Typically the filters, i.e., 28 and 35, will be cartridge type filter systems (typically designed for removing particles on the order of about 1 $\mu$ and above), but other functionally equivalent systems could be used. Periodically, the filter systems are opened, the filters are cleaned or replaced, and the silver-CA complex is removed and sent to a processing site for recovery and refining of the silver. Conveniently, at the same time, the reservoirs, pumps, and conduits may be cleaned and serviced.

Those skilled in this art will appreciate that the embodiment of the invention exemplified in FIG. 3 may be constructed of materials and components well known in the art of chemical processing and commercially available although some modifications, well within the capability of one skilled in the art, might be required. Two dosing stages in most circumstances render the effluent sufficiently free of silver to be put into a municipal sewage system. However, if the level of silver or the level of ferric/ferrous complexes are extraordinarily high, one or more additional stages might be required. In this respect, although FIG. 3 describes a two stage dosing system, it will be appreciated by those skilled in the art that additional dosing stages, i.e., each stage comprising a CA reservoir, dose metering timing conduit, filter system, and associated conduits with connectors, could be added as needed.

Figure 4:
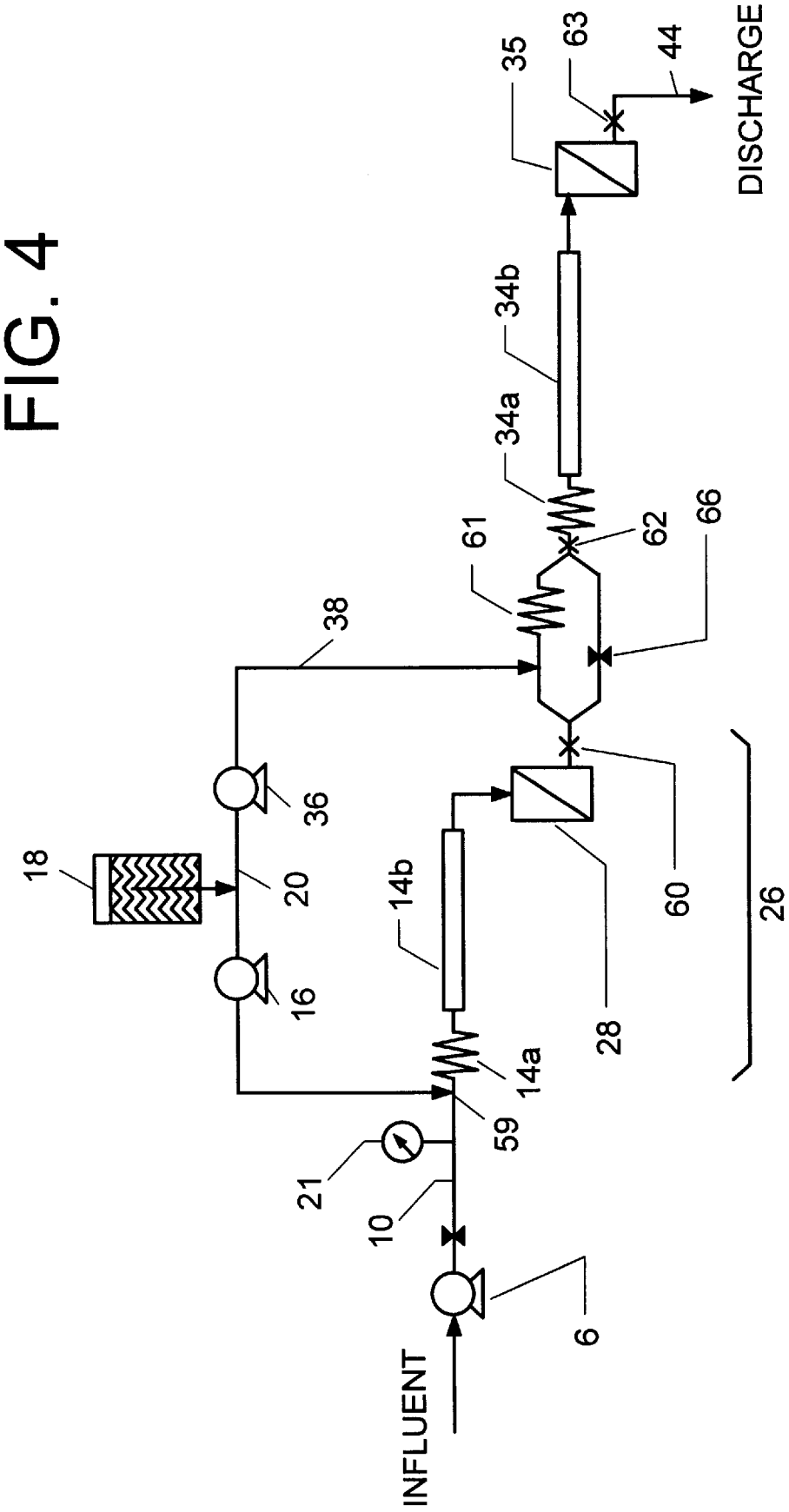
FIG. 4 is a schematic diagram illustrating a variation of the embodiment of the present invention illustrated in FIG. 3.

FIG. 4 schematically illustrates a variation of the embodiment shown in FIG. 3 with the same reference numbers being used to indicate similar components. This embodiment features an arrangement for controlling the flow effluent between the first and second stage filter systems. As shown therein, the effluent from a minilab passed through feed pump 6, pressure switch 21, and mixed with an appropriate amount of the solution of CA held in reservoir 18 and introduced via first stage metering pump 16. The mixture is next passed through mixing conduit 14a and precipitation conduit 14b into the first stage filter system 26, e.g. a cartridge filter.

The aqueous effluent from the first stage filter system is mixed with an additional amount of CA solution from reservoir 18 via second stage metering pump 36. The mixture is passed through a mixing conduit 61 and then through mixing conduit 34a before being passed through precipitation conduit 34b. The mixture is then passed the second stage filter 35, e.g. a cartridge filter, and the treated effluent with silver substantially completely removed therefrom is passed to discharge.

Valve 66 controls the ratio of effluent from the first stage filter system that is mixed with the CA solution and the effluent that passes directly to mixing conduit 34a. Typically, the volume ratio of effluent passing through mixing conduit 61 to the effluent passing directly to mixing conduit 34a is from about 1:1 to about 4:1, preferably from about 1:1 to about 2:1. In order to provide fast and simple replacement of the first and second stage precipitation systems, quick disconnects are provided as indicated at 59, 60, 62 and 63.

Figure 5:
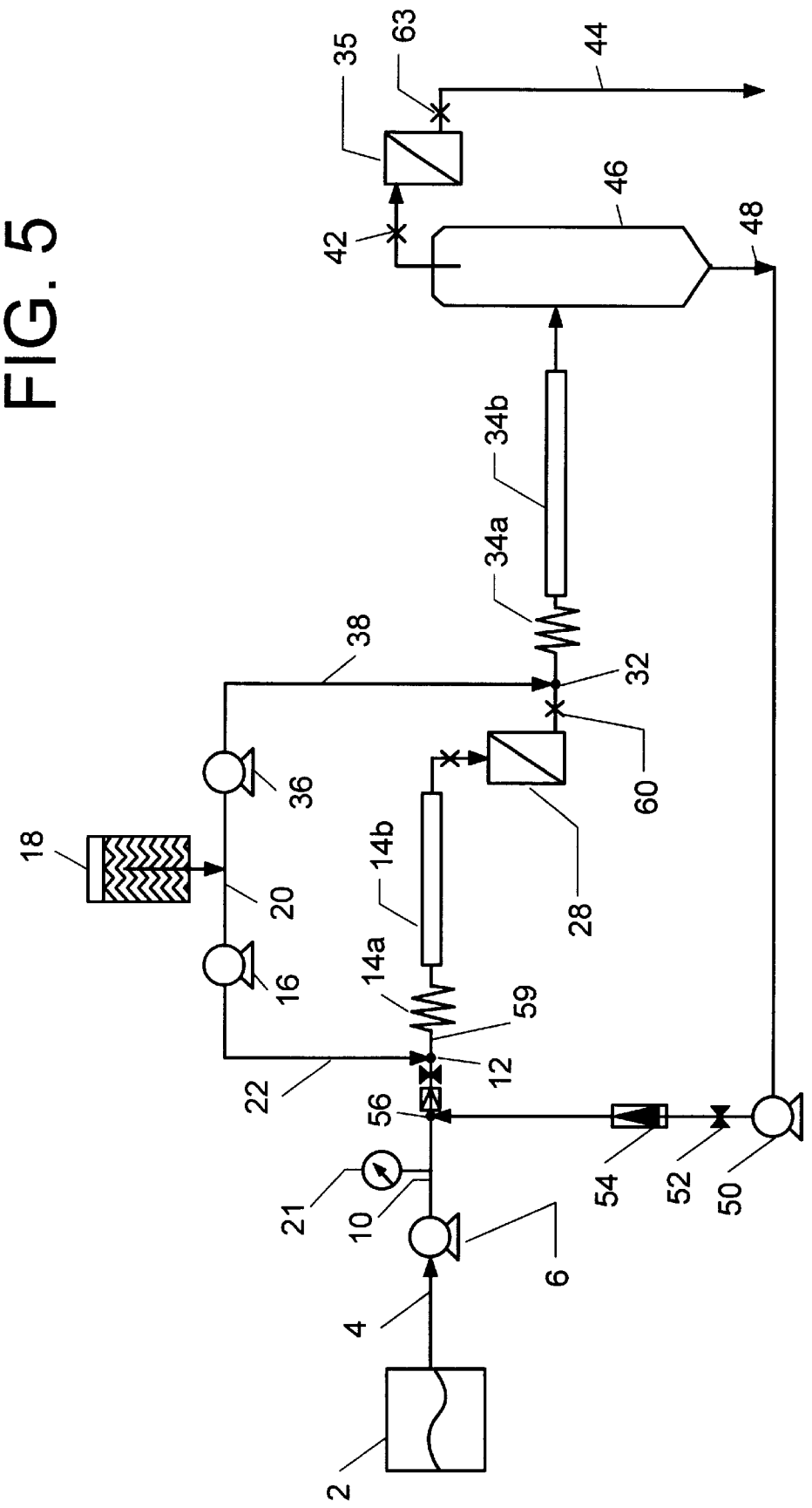
FIG. 5 is a schematic diagram illustrating a second embodiment of the present invention which includes recycle of effluent.

FIG. 5 illustrates schematically another embodiment of the apparatus of the present invention which is a variation of the apparatus illustrated in FIGS. 3 and 4. In this embodiment, a clarification chamber 46 is positioned after the second timing conduit 34b and before the second filter 35. This embodiment allows the effluent with excess unreacted CA to be recycled thereby improving the efficiency of the process.

Referring to FIG. 5, the components are substantially the same as the apparatus of the embodiment illustrated in FIG. 3, up to where the effluent exits the second timing conduit 34b. For simplicity and clarity of illustration, the internal filter system components and other components or labels of components are not shown in FIG. 5 where their existence is understood from the discussion of FIG. 3. More specifically, upon exiting timing conduit 34b, the effluent and precipitated CA-silver chelate enter a clarification chamber 46 wherein the CA-silver chelate tends to settle to the bottom.

Pump 50 draws the material from at or near the bottom of the clarification chamber 46, through conduit 48, and introduces it through union 56 into intake conduit 10 where it is recycled through the apparatus. The flow of the recycled bottom liquid may be regulated by control valve 52, and back flow is prevented by check valve 54.

Figure 6:
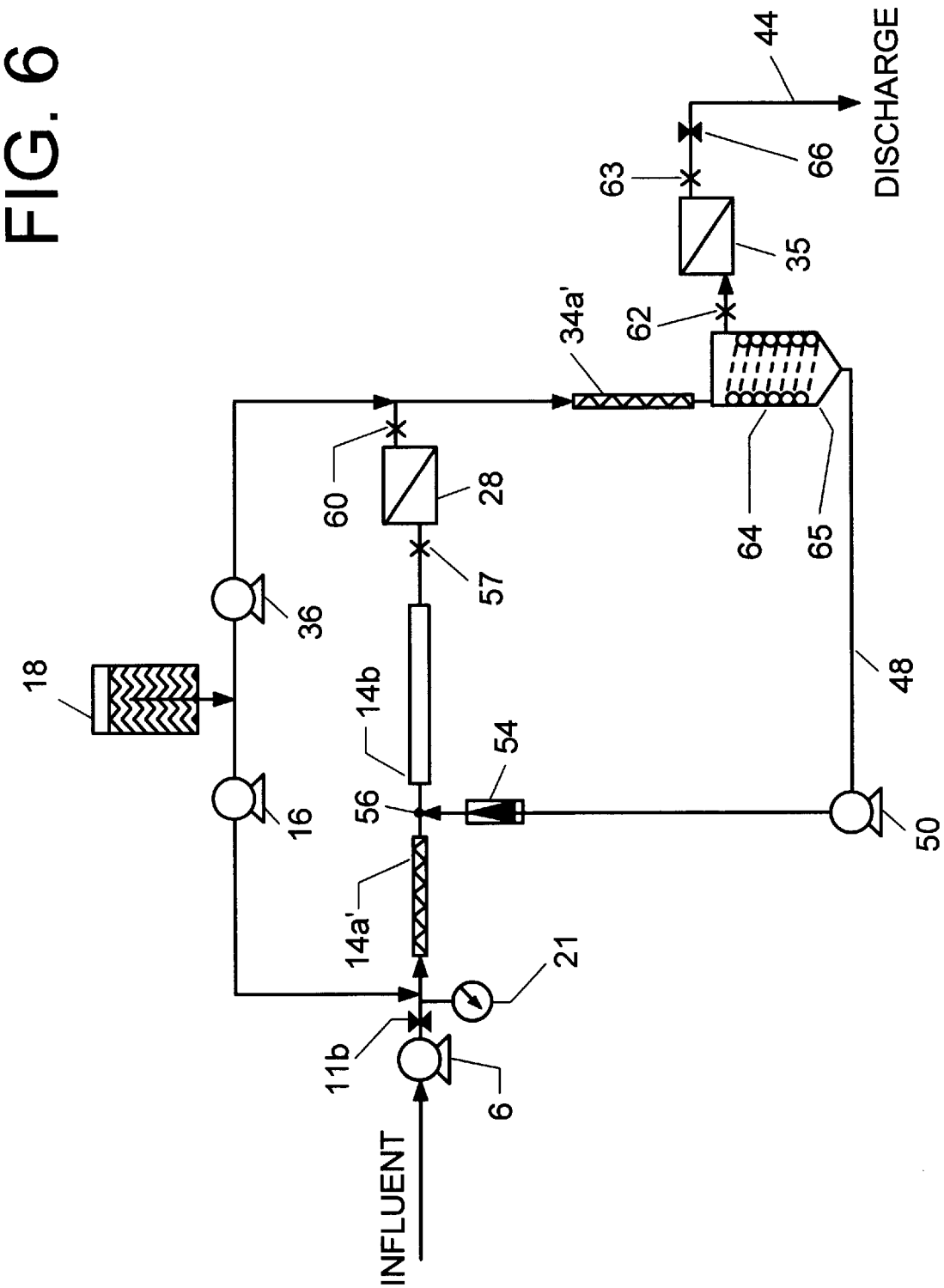
FIG. 6 is a schematic diagram illustrating a variation of the second embodiment of the present invention illustrated in FIG. 5.

A variation of the embodiment illustrated in FIG. 5, is schematically illustrated in FIG. 6 with like reference numbers indicating like elements. In this variation, the second precipitation conduit and the clarification chamber have been integrated into a single unit 65. As illustrated, the unit has a spirally arranged tubing 64 in which the precipitate forms and settles to the bottom where it is recycled via pump 50. Also, static mixers 14a' and 34a' are used in place of the mixing conduits 14 and 34 of the previous embodiments.

Figure 7:
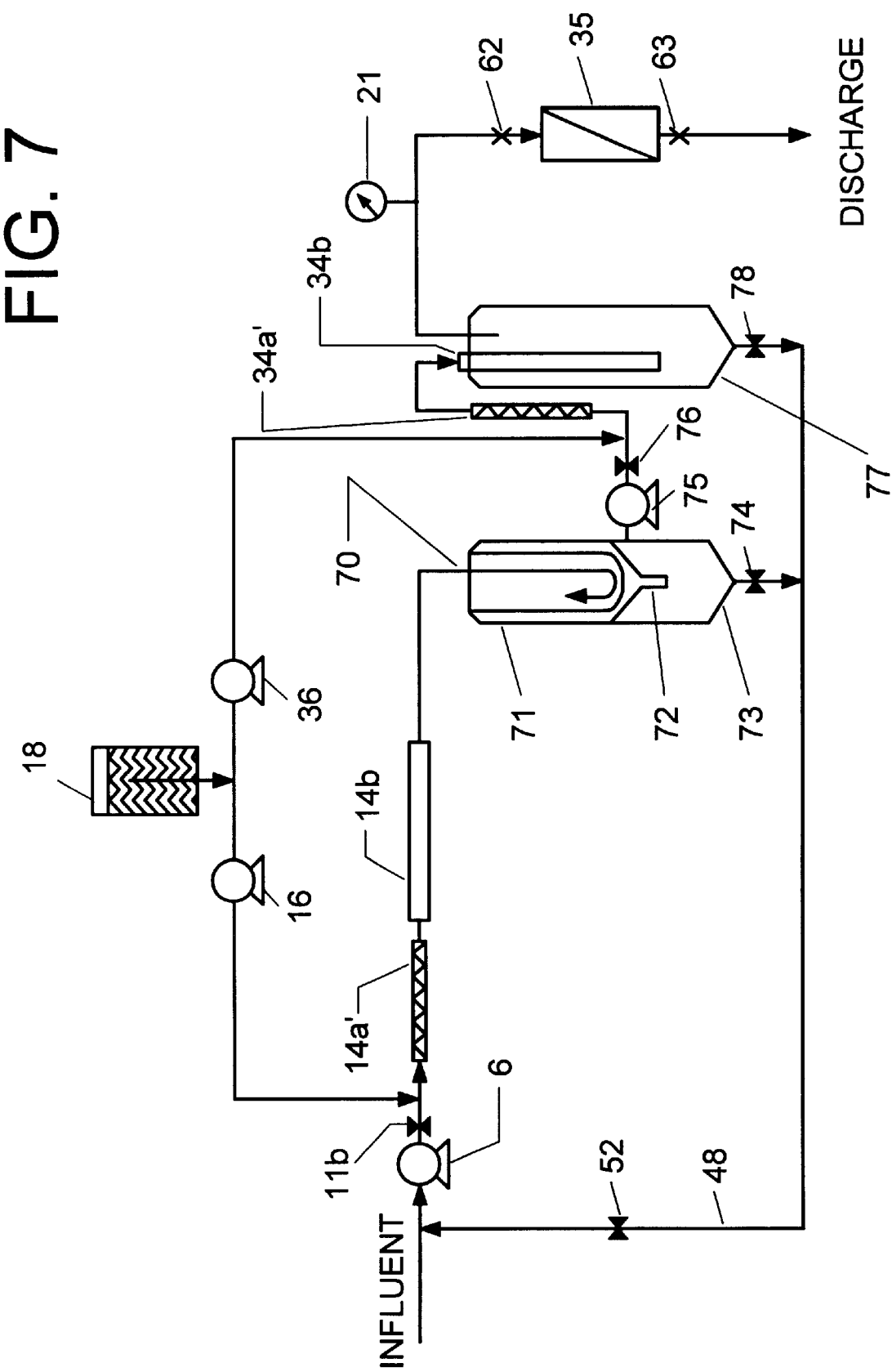
FIG. 7 is a schematic diagram illustrating a second variation of the second embodiment of the present invention illustrated in FIG. 5.

A further variation of this embodiment is illustrated in FIG. 7 wherein like reference numbers again indicate like elements. In this variation, after the solution of the CA is added from reservoir 18 by first stage metering pump 16 and passed through static mixer 14a' and precipitation conduit 14b, the treated effluent is introduced into a first stage filter system 70 which in this instance is a bag filter 71 selected to remove particles of from about 1 to 10 microns by gravitational filtration. The bag filter 71 is supported in filter holder 72 which is located in the upper portion of clarification chamber 73. Particles of precipitate passing through the bag filter 71 can settle to the bottom of the clarification chamber 73. A portion of the effluent can be recycled via conduit 48 under the influence of feed pump 6 as controlled by valves 74 and 52.

The separated effluent can be drawn from the clarification chamber 73 at a location above the bottom via pump 75 and valve 76. An additional portion of the solution of CA is drawn from reservoir 18 by second stage metering pump 36 and passed through static mixer 34a' and precipitation conduit 34b. In this variation, the precipitation conduit 34b is at least partially positioned within clarification chamber 77. Further chelate silver can settle to the bottom of the clarification chamber 77 and be recycled under the influence of feed pump 6 as controlled by valves 78 and 52. The effluent can then be passed to the second stage filter system 35 which contains a cartridge filter that is designed to remove particles on the order of 1 micron before the effluent is discharged.

Those skilled in the art of photochemical processing will appreciate that the relative location of the components of the apparatus described above and shown in FIG. 3 to FIG. 7 can be varied while still maintaining their functional relationship. Further, refinements and improvements in the components are within the scope of the embodiment taught herein. For example, quick disconnect joints might be added at additional strategic points through out the apparatus to facilitate removal of components for cleaning, replacement, and repair. Likewise, pressure control switches may be used to maintain appropriate pressure through out the conduits of the apparatus, and the incorporation of warning and fail-safe means to indicate low levels of CA in the reservoir and to prevent damage could be installed. Although the apparatus of the present invention is especially suited for use in conjunction with a photo finishing minilab, it could be used with X-ray film processing units, and, with some modifications and resizing, it could be used for large, fixed photo finishing laboratories.

The present invention will be explained in greater detail with reference to the following examples and comparative examples.

EXAMPLES 1 AND 2 AND COMPARATIVE EXAMPLES 1

Minilab mixed overflow effluent (as described above) containing 2.7 g/l of silver and iron as a ferric/ferrous amino carboxylate complex in a concentration of approximately 3.0 g/l as iron was treated with a CA composed of a 10% diluted aqueous solution of L-1 containing 35–40% polymer content prior to dilution. The CA was added with single (Comparative Example 1) and double doses (Examples 1 and 2) using the arrangement illustrated in FIG. 5. The throughput for the system ranged from 73 to 94 ml/min and the recycle rate was approximately 90 ml/min. The results are shown in Table 1. The dosing ratio is calculated as the weight ratio of undiluted L-1 to the total weight of silver treated.

TABLE 1

COMPARISON OF TWO-STEP AND ONE-STEP TREATMENT WITH RECYCLING

| Example No. | Total Dose Ratio (wt L-1 to wt silver) | Residual silver (ppm) |
|---|---|---|
| Example 1 | 4.4(3.6 + 0.8) to 1 | 0.1 |
| Example 2 | 4.9(3.9 + 1.0) to 1 | <0.04 |
| Comparative Example 1 | 4.6 to 1 | 17 to 26 |

EXAMPLE 3 AND COMPARATIVE EXAMPLE 2

Minilab mixed overflow effluent (as described above) was obtained containing 2.5 g/l of silver and iron in the form of ferric/ferrous amino carboxylate complex in a concentration of approximately 3 g/l as iron. The effluent was treated without recycle using the arrangement illustrated in FIG. 3 operated at a throughput of 90 ml/min. The results are shown in Table 2. The dosing ratio is calculated as the weight ratio of undiluted L-1 to the total weight of silver treated.

TABLE 2

COMPARISON OF TWO-STEP AND ONE-STEP TREATMENT WITHOUT RECYCLING

| Example No. | Total Dose ratio (wt CA solution to wt silver) | Residual silver (ppm) |
|---|---|---|
| Example 3 | 4.0 (3.2 + 0.8) to 1 | 0.2–0.3 |
| Comparative Example 2 | 3.2 to 1 | 73 |

EXAMPLE 4 AND COMPARATIVE EXAMPLE 3–4

Minilab mixed overflow effluent (as described above) was obtained containing silver in a concentration of 2.3 g/l and iron in the form of ferric/ferrous amino carboxylate complex in a concentration of approximately 3 g/l as iron. The effluent was treated using the arrangement illustrated in FIG. 5 operated at throughput ranging from 76 to 98 ml/min.

In the first stage, the effluent was treated with a CA composed of a 15% diluted (w/v) aqueous solution of B-5636 (containing 25% polymer content prior to dilution). The diluted B-5636 solution was added and subjected to mixing for 1.8 to 2.4 seconds with the influent. The resulting precipitate was permitted to grow for 1.1 to 1.4 minutes by passing the mixture through a precipitation conduit. The mixture was then subjected to a first stage filter system containing a cartridge filter obtained from e.g. Harmsco Co. that was designed to remove particles on the order of 1 micron and above. The concentration of the residual silver remaining in the effluent was determined by atomic absorption spectroscopy.

In the second stage, a further amount of the 15% diluted (w/v) aqueous solution of B-5636 was added to the remaining effluent from the first stage filter system and subjected to mixing for 3.7 to 5.2 seconds. The precipitate was permitted to grow for 2.1 to 3.1 minutes by passing the mixture through a precipitation conduit. The resulting mixture was collected in a clarification chamber. A stream of the mixture at the bottom of the clarifier was recycled to be combined with the untreated effluent at a rate of 125 ml/min. The mixture overflow trough the top of the clarifier was subjected to a second stage filter system containing the same type of cartridge filter used in the first stage filter system and the silver concentration of the effluent was determined.

The results of these experiments are summarized in Table 3. The dosing ratio is calculated as the weight ratio of undiluted B-5636 to the total weight of silver treated.

TABLE 3

COMPARISON OF TWO-STEP AND ONE STEP TREATMENT WITH RECYCLE

| Example No. | Total Dose ratio (wt CA solution to wt silver) | Residual silver (ppm.) |
|---|---|---|
| Example 4 | 5.5(4.4 + 1.1) to 1 | 0.12 |
| Comparative Example 3 | 5.1:1 | 68 |
| Comparative Example 4 | 5.7:1 | 29 |

EXAMPLE 5 AND COMPARATIVE EXAMPLE 5

Minilab mixed overflow effluent (as described above) was obtained containing silver in a concentration of 2.7 g/l and iron in the form of ferric/ferrous amino carboxylate complex in a concentration of approximately 2.9 g/l as iron. The effluent was treated using the arrangement illustrated in FIG. 3 operated at throughput of 100 ml/min.

In the first stage (the only stage for the Comparative Example), a 20% diluted (w/v) aqueous solution of B-5636 was added and subjected to mixing for 3 seconds. The precipitate was permitted to grow for 1.9 minutes. The mixture was subjected to a first stage filter system containing a polypropylene cartridge filter obtained from Filterite (Timonium, Md.) under the designation U005A10U that was designed to remove particles on the order of 5 microns and above. The concentration of the silver remaining in the effluent was determined by atomic absorption spectroscopy.

In the second stage, a 10% diluted (w/v) aqueous solution of B-5636 was added to the remaining effluent from the first stage filter system and subjected to mixing for 5 seconds. The precipitate was permitted to grow for 3.3 minutes. The mixture was subjected to a second stage filter system containing a micro-fiberglass cartridge filter obtained from Keystone (Hatfield, Pa.) under the designation 08F01020HE that was designed to remove particles on the order of 1 to 3 microns. The concentration of the silver remaining in the effluent was then again determined.

The results of these experiments are summarized in Table 4.

TABLE 4

COMPARISON OF TWO-STEP AND ONE-STEP TREATMENT WITHOUT RECYCLE.

| Example No. | total dose ratio (Wt CA to wt silver) | Residual silver (ppm) |
|---|---|---|
| Ex. 5 | 5.0(3.4 + 1.6) to 1 | 188 |
| Comparative Ex. 4 | 5.8 to 1 | 445 |

EXAMPLES 6–7 AND COMPARATIVE EXAMPLES 5–6

Minilab mixed overflow effluent (as described above) was obtained containing silver in a concentration of 1.44 g/l and iron as a ferric/ferrous amino carboxylate complex in a concentration of 3.30 g/l as iron. Based on the weight of metal ions, the effluent was treated on a batch basis as follows: an amount of a 10% diluted (w/v) B-5636 aqueous solution, equivalent to the dosage indicated in Table 5 was added to 150 mls of the effluent. The solution was agitated for 15 seconds, allowed to stand for 2 minutes, then filtered with a double layer of Whatman No. 5 filter paper to separate the precipitate from the filtrate. This was the only treatment for the comparative single dose examples shown in Table 5.

Next, an amount of the 10% diluted (w/v) B-5636 aqueous solution was added to 100 mls of the resulting filtrate to give an additional 0.8 to 1 treatment dose. This solution was, as before, mixed for 15 seconds, allowed to stand for 2 minutes, then filtered with a double layer of Whatman No. 5 filter paper to separate the second precipitate from the filtrate. Both filtrates were analyzed for their silver content by atomic absorption spectroscopy and the results are presented in Table 5. The calculated percentage reduction of silver is also provided in Table 5.

TABLE 5

BATCH TEST RESULTS. TWO-STEP AND ONE-STEP TREATMENTS.

| Example No. | Total Dose ratio (wt CA solution to wt silver) | Residual silver (ppm) | % Reduction |
|---|---|---|---|
| Example 6 | 3.2(2.4 + 0.8) to 1 | 3.51 | 99.8 |
| Example 7 | 4.0(3.2 + 0.8) to 1 | <0.04 | >99.9 |
| Comparative Example 5 | 3.2 | 144 | 90 |
| Comparative Example 6 | 4.0 | 47.9 | 96.7 |

EXAMPLE 8

Minilab mixed overflow effluent (as described above) containing silver in a concentration of 1.35 g/l and iron (as a ferric/ferrous amino carboxylate complex) in a concentration of 3.6 g/l as iron was used. Based on the weight of metal ions, the effluent was treated on a batch basis as follows: a series of solutions containing one or both of an amount of a 25% diluted (w/v) B-5636 aqueous solution and an amount of 1.34 M/L sodium sulfide aqueous solution (prepared from the hydrate salt), as indicated in Table 6 were added to separate beakers each containing 100 mls of the effluent. Both the B-5636 and sodium sulfide solutions were prepared using water previously adjusted to pH 12.0 with 0.01 M. sodium hydroxide solution. The treated effluent solution was agitated for 15 seconds, allowed to stand for 5 minutes, then filtered with a double layer of Whatman No. 5 filter paper to separate the precipitate from the filtrate.

TABLE 6

COMPARISON OF APPARENT PRECIPITATE BULK DENSITY AND SILVER REMOVAL RATES WITH VARIOUS SODIUM SULFIDE/B-5636 TREATMENT RATIOS.

| Parameter | TEST NO. | | | | | |
|---|---|---|---|---|---|---|
| | A | B | C | D | E | F |
| B-5636/Ag ratio (w/w) | 6.8 | 5.3 | 3.4 | 2.1 | 1.1 | None |
| Sodium sulfide/Ag ratio (molar) | None | 0.12 | 0.26 | 0.36 | 0.45 | 0.523 |
| B-5636/sulfide ratio (w/w) | n/a | 154 | 44 | 20 | 8 | n/a |
| Apparent precipitate bulk density | low | med-low | med | med-high | high | high |
| Ag removed (%) | 98 | 82 | 67 | 58 | 41 | 45 |

EXAMPLES 9 TO 13 AND COMPARATIVE EXAMPLES 7 TO 11

Minilab mixed overflow effluent (as described above) was obtained containing silver in a concentration of 1.35 g/l and iron aminocarboxylate complex in a concentration of approximately 3.6 g/l as iron. The effluent was treated using a sequential batch arrangement described below.

In the first stage (the only stage for the Comparative Examples), a blended CA composition "CA-1" was added as a single dose to separate beakers each containing 150 mls of effluent solution according to Table 7. CA-1 was formulated to contain 2.5% (w/v) aqueous solution of B-5636 and 0.76 M/L of sodium sulfide dissolved in water that had been previously adjusted to pH 12.0 with 0.01 M/L sodium hydroxide solution. The dose ratio was calculated based on the Ag level in the effluent solution prior to treatment and is expressed as the ratio of the mls of CA-1 to grams of silver in the effluent.

The CA-1 treated effluent solutions were agitated for 15 seconds, allowed to stand for 5 minutes, then filtered separately with a double layer of Whatman No. 5 filter paper to separate the precipitate from the filtrate. In the second stage treatment (Examples 8–14), a second dose of CA-1 was added, as described in Table 7, to separate beakers each containing a 100 ml batch of filtrate from the first stage filtration. As before, the thus treated effluent solution was agitated for 15 seconds, allowed to stand for 5 minutes, then filtered separately with a double layer of Whatman No. 5 filter paper to separate the precipitate from the filtrate. The concentration of the silver remaining in the effluent in both the single stage filtrate (Comparative Examples 7–11) and first and second stage filtrates (Examples 9–13) were determined by atomic absorption spectroscopy.

The results of these experiments are summarized in Table 7.

TABLE 7

COMPARISON OF TWO-STEP (INVENTIVE) AND ONE-STEP (COMPARATIVE) TREATMENT WITH CA-1 IN A BATCH SYSTEM.

| Example No.* | Total Dose Ratio (mls of blended CA-1 to wt of silver) | Residual silver (ppm) |
| --- | --- | --- |
| Comparative Example 7 | 15 to 1 | 26.4 |
| Example 9 | 15(12 + 3) to 1 | 25.8 |
| Comparative Example 8 | 18 to 1 | 3.3 |
| Example 10 | 18(15 + 3) to 1 | <0.04 |
| Comparative Example 9 | 20 to 1 | 2.17 |
| Example 11 | 20(18 + 2) to 1 | <0.04 |
| Comparative Example 10 | 22 to 1 | 1.36 |
| Example 12 | 22(20 + 2) to 1 | <0.04 |
| Comparative Example 11 | 25 to 1 | 0.61 |
| Example 13 | 25(22 + 3) to 1 | <0.04 |

*The Comparative Examples have been numbered for ease of comparison. It will be understood by those skilled in the art that the present invention is not limited to the foregoing examples and that modifications may be made without departing from the spirit and scope of the invention.

It will be understood by those skilled in the art that the present invention is not limited to the foregoing examples and that modifications may be made without departing from the spirit and scope of the invention.

What is claimed is:

1. A process for treating an aqueous effluent comprised of from about 100 ppm to about 10 g/l ferric/ferrous complexes, from about 500 ppm to about 10 g/l silver and water, said process comprising:
   a) adding to the aqueous effluent a first amount of a chelating agent, the chelating agent being selected from the group consisting of a water-soluble sulfur containing polymer chelating agent or a mixture of the polymer chelating agent and a water soluble non-polymeric sulfur containing compound capable of forming a water insoluble complex with silver, to form a precipitate and a first residual aqueous effluent;
   b) adding to the first residual aqueous effluent a second amount of the chelating agent to form a precipitate and a second residual aqueous effluent wherein the second amount of the water-soluble sulfur containing polymer chelating agent added to the first residual aqueous effluent is less than the first amount of the water-soluble sulfur containing polymer chelating agent added to the aqueous effluent; and
   c) separating the precipitate from the second residual aqueous effluent.

2. The process of claim 1 wherein the precipitate formed after the addition of the first amount of chelating agent is separated from the first residual aqueous effluent.

3. The process of claim 1 wherein the ratio of the second amount of the water soluble sulfur containing polymer chelating agent to the amount of silver treated with said second amount of the chelating agent is greater than the ratio of the first amount of the chelating agent to the amount of silver treated with said first amount of the chelating agent.

4. The process of claim 1 wherein the ratio of the second amount of the non-polymeric sulfur containing compound to the amount of silver treated with said second amount of the compound is greater than the ratio of the first amount of the compound to the amount of silver treated with said first amount of the compound.

5. The process of claim 1 wherein an amount of the precipitate from at least one of steps (a) and (b) is combined with the aqueous effluent.

6. The process of claim 1 where a mixture of the water-soluble sulfur containing polymer chelating agent and the non-polymeric sulfur containing compound is added to the aqueous effluent and wherein the weight/weight ratio of the non-polymeric sulfur containing compound to the water-soluble sulfur containing polymer chelating agent is in the range of 1:44 to 1:5.

7. The process of claim 1 where a mixture of the water-soluble sulfur containing polymer chelating agent and the non-polymeric sulfur containing compound is added to the aqueous effluent and wherein the weight/weight ratio of the non-polymeric sulfur containing compound to the water-soluble sulfur containing polymer chelating agent is in the range of 1:20 to 1:8.

8. The process of claim 1 where a mixture of the water-soluble sulfur containing polymer chelating agent and the non-polymeric sulfur containing compound is added to the aqueous effluent and wherein the water-soluble sulfur containing polymer chelating agent added in step a) is the same as in step b).

9. The process of claim 1 where a mixture of the water-soluble sulfur containing polymer chelating agent and the non-polymeric sulfur containing compound is added to the aqueous effluent and wherein the non-polymeric sulfur containing compound added in step a) is the same as in step b).

10. The process of claim 1 wherein the water-soluble sulfur containing polymer chelating agent has the sulfur atom in the form of a group selected from the group consisting of a thiol group, a thiocarboxyl group, a dithiocarboxyl group and a dithiocarbamic acid group and salts thereof.

11. The process of claim 1 where a mixture of the water-soluble sulfur containing polymer chelating agent and the non-polymeric sulfur containing compound is added to the aqueous effluent and wherein the non-polymeric sulfur containing compound is selected from the group consisting of water soluble alkali metal monosulfides, polysulfides, hydrogen sulfides, alkyl sulfides, C1 to C4 alkyl dithiocarbamates, and mercapto-S-triazines and salts thereof.

12. The process of claim 1 where a mixture of the water-soluble sulfur containing polymer chelating agent and the non-polymeric sulfur containing compound is added to the first residual aqueous effluent and wherein the non-polymeric sulfur containing compound is selected from the group consisting of water soluble alkali metal monosulfides, polysulfides, hydrogen sulfides, alkyl sulfides, C1 to C4 alkyl dithiocarbamates, and mercapto-S-triazines and salts thereof.

13. The process of claim 1 where a mixture of the water-soluble sulfur containing polymer chelating agent and the non-polymeric sulfur containing compound is added to the aqueous effluent and wherein the non-polymeric sulfur containing compound is selected from the group consisting of sodium sulfide, sodium diethyldithiocarbamate, or sodium dimethyldithiocarbamate.

14. The process of claim 1 wherein the separating of step c) is by settling.

15. The process of claim 1 wherein the separating of step c) is by filtering.

16. The process of claim 1 wherein the separating of step c) is by settling and filtering.

17. The process of claim 1 wherein at least a portion of the second residual aqueous effluent is treated by settling to permit additional particles to settle.

18. The process of claim 1 wherein at least a portion of the second residual aqueous effluent is treated by filtering.

19. The process of claim 1 wherein at least a portion of the second residual aqueous effluent is treated by settling to permit additional particles to settle and filtering the remaining effluent.

20. The process of claim 1 wherein the aqueous effluent is waste water from photo finishing.

21. The process of claim 20 wherein the photo finishing processor is a minilab.

22. The method of claim 1 wherein the chelating agent is a compound of Formula (I), (II), or (III); or a mixture thereof

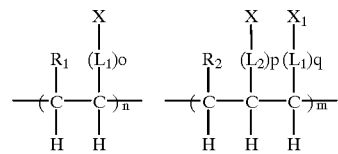

(I)

wherein, one of X and $X_1$ is SM, —NHCOSM, —NHCS$_2$M, or —CH$_2$NHCS$_2$M, and the other is H;

$R_1$ and $R_2$ are independently H, alkyl, aryl, alkoxyl (substituted or unsubstituted), hydroxyl, carboxyl, thiol or amino;

$L_1$ and $L_2$ are independently a substituted or unsubstituted divalent alkyl, aryl, or alkoxyl linking group;

o, p, q are independently 0 or 1;

M is independently H, or a cation;

$0 \leq n \leq 30,000$;

$0 \leq m \leq 30,000$;

(n+m)>100;

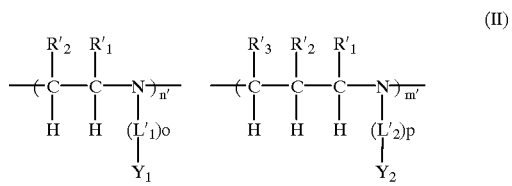

(II)

wherein, $Y_1$ and $Y_2$ are independently —COSM' or —CS$_2$M';

$R'_1$, $R'_2$, and $R'_3$ have the same definitions as $R_1$ and $R_2$ in Formula (I) and can be the same or different;

$L'_1$, and $L'_2$, have the same definitions as $L_1$ and $L_2$ in Formula (I) and can be the same or different;

M' is H, or a cation;

o, p are independently 0 or 1;

$0 \leq n' \leq 30,000$;

$0 \leq m' \leq 30,000$;

(n'+m')>100;

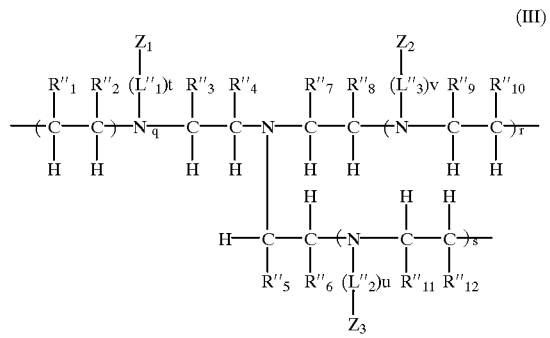

(III)

wherein $Z_1$, $Z_2$, and $Z_3$ are independently H, CS$_2$M", COSM"; but are not all H;

M" is independently H or a cation;

$R_1$" through $R_{12}$" are independently H, substituted or unsubstituted alkyl, aryl, alkoxyl groups; or hydroxyl, thiol, amino, carboxyl, thiocarboxyl, or dithiocarbamate;

$L_1$", $L_2$", and $L_3$" have the same definitions as $L_1$ and $L_2$ in Formula (I) and can be the same or different;

t, u, v are independently 0 or 1;

$0 \leq q, r, s \leq 30,000$; and the sum of q, r and s is an integer greater than 15.

* * * * *